(12) United States Patent
Xiong

(10) Patent No.: US 10,742,119 B2
(45) Date of Patent: Aug. 11, 2020

(54) DISPLAY DEVICE, DISPLAY PANEL POWER SUPPLY SYSTEM AND DISPLAY PANEL POWER SUPPLY CIRCUIT

(71) Applicant: HKC CORPORATION LIMITED, Shenzhen, Guangdong (CN)

(72) Inventor: Zhi Xiong, Guangdong (CN)

(73) Assignee: HKC CORPORATION LIMITED, Shenzhen, Guangdong (CN)

(*) Notice: Subject to any disclaimer, the term of this patent is extended or adjusted under 35 U.S.C. 154(b) by 0 days.

(21) Appl. No.: 16/312,375

(22) PCT Filed: Dec. 13, 2018

(86) PCT No.: PCT/CN2018/120807
§ 371 (c)(1),
(2) Date: Dec. 21, 2018

(87) PCT Pub. No.: WO2020/103231
PCT Pub. Date: May 28, 2020

(65) Prior Publication Data
US 2020/0169169 A1    May 28, 2020

(51) Int. Cl.
*H02M 1/096* (2006.01)
*H02M 3/158* (2006.01)
*G09G 3/20* (2006.01)
*H02M 1/00* (2006.01)

(52) U.S. Cl.
CPC .......... *H02M 3/158* (2013.01); *G09G 3/2007* (2013.01); *H02M 1/096* (2013.01); *G09G 2320/0276* (2013.01); *G09G 2330/00* (2013.01); *H02M 2001/0006* (2013.01); *H02M 2001/0045* (2013.01)

(58) Field of Classification Search
CPC ......... G09G 3/2007; G09G 2320/0276; G09G 2330/00; H02M 3/158; H02M 1/096; H02M 2001/0006; H02M 2001/0045
See application file for complete search history.

(56) References Cited

U.S. PATENT DOCUMENTS

| | | | | |
|---|---|---|---|---|
| 2005/0012700 A1* | 1/2005 | Hara | ............ | G09G 3/3688 345/89 |
| 2014/0192095 A1* | 7/2014 | Liao | ............ | G09G 3/3688 345/690 |
| 2018/0301079 A1* | 10/2018 | Tsuchi | ............ | G09G 3/3696 |

* cited by examiner

*Primary Examiner* — Ryan A Lubit
(74) *Attorney, Agent, or Firm* — Law Offices of Albert Wai-Kit Chan, PLLC

(57) ABSTRACT

The present disclosure relates to the field of display technology, and provides a display device, a display panel power supply system and a display panel power supply circuit thereof, the display panel power supply circuit includes: a power supply chip connected with an external power supply; and a gamma chip connected with the power supply chip and the data driving chip.

14 Claims, 3 Drawing Sheets

DISPLAY DEVICE, DISPLAY PANEL POWER SUPPLY SYSTEM AND DISPLAY PANEL POWER SUPPLY CIRCUIT

CROSS-REFERENCE TO RELATED APPLICATION

This application is the PCT Application No. PCT/CN2018/120807 for entry into US national phase, with an international filing date of Dec. 13, 2018 designating US, now pending, claims priority to Chinese Patent Application No. 201811397019.9, filed with China National Intellectual Property Agency on Nov. 22, 2018 and titled "display device, display panel power supply system and display panel power supply circuit thereof", and claims priority to Chinese Patent Application No. 201821939676.7, filed with China National Intellectual Property Agency on Nov. 22, 2018 and titled "display device, display panel power supply system and display panel power supply circuit thereof", the content of which are incorporated herein by reference in its entirety.

TECHNICAL FIELD

The present disclosure relates to the field of display technology, and more particularly to a display device, a display panel power supply system and a display panel power supply circuit thereof.

BACKGROUND

The statements herein only provide background information related to the present disclosure without necessarily constituting the prior art.

Thin film transistor liquid crystal display, which is usually abbreviated as TFT-LCD, is one of plurality of liquid crystal displays, and uses thin film transistor technology to improve the image quality. Although the TFT-LCD is collectively referred to as LCD, the TFT-LCD is an active matrix LCD and is applied in a television, a flat display and a projector. A traditional drive system power supply architecture of a thin film transistor liquid crystal display and a source driver IC (Integrated Circuit) is implemented by using a power supply chip to generate three paths voltages of HVAA VDDA and VDDD and using a gamma chip to generate a gamma voltage is generated by the gamma chip, and then connecting the three paths voltages of HVAA VDDA and VDDD and the gamma voltage to an interior of the Source driver IC through a wiring of a PCB (Printed Circuit Board); due to the fact that DC-DC IC needs to generate voltages including HVAA, VDDA and VDDD, such that the DC-DC IC has a complex design and relatively high cost, there are so many wirings of the PCB, so that the area and the cost of the PCB are increased.

Therefore, there is a problem that the power supply chip in the traditional technical solution has complex design and relatively high cost and there are many PCB wirings, so that the area and the cost of the PCB are increased.

SUMMARY

An object of the present disclosure is to provide a display panel power supply circuit which aims at solving the problem that the power supply chip in the traditional technical solution has complex design and relatively high cost and there are many PCB wirings, so that the PCB area and cost are increased.

An embodiment of the present disclosure provides a display panel power supply circuit which is connected with an external power supply and a data driving chip and comprises:

a power supply chip configured to be connected with the external power supply and convert the external power supply into a first voltage and a second voltage;

a gamma chip configured to be connected with the power supply chip and the data driving chip and receive the first voltage and the second voltage and generate a gamma voltage according to the first voltage and the second voltage;

a third voltage generation circuit configured to be connected with the gamma chip and generate a third voltage according to the gamma voltage, where the third voltage generation circuit is arranged in the data driving chip;

where the first voltage, the second voltage and the third voltage each are working voltages of the data driving chip.

In one embodiment, the third voltage generation circuit includes a first resistor, a second resistor, a first switching transistor and a second switching transistor; a first end of the first resistor serves as a first input of the third voltage generation circuit, a first end of the second resistor serves as a second input of the third voltage generation circuit, a second end of the first resistor is connected with a second end of the second resistor, an input of the first switching transistor is connected with the power supply chip, an input of the second switching transistor is grounded, an output of the first switching transistor is connected with an output of the second switching transistor, a control terminal of the first switching transistor is connected with a control terminal of the second switching transistor, a common connection terminal of the first resistor and the second resistor are connected with a common connection terminal of a control terminal of the first switching transistor and a control terminal of the second switching transistor, and a common connection terminal of an output of the first switching transistor and an output of the second switching transistor serves as an output of the third voltage generation circuit.

In one embodiment, the first switching transistor is a NPN triode and the second switching transistor is a PNP triode.

In one embodiment, the first switching transistor is a MOS transistor and the second switching transistor is a MOS transistor.

In one embodiment, the gamma voltage includes n paths output voltages, where N is a positive integer that is no less than 2, and any two paths output voltages in the N output voltages are connected with the third voltage generation circuit.

In one embodiment, N is equal to 18, wherein both a ninth voltage and a tenth voltage are connected with the third voltage generation circuit.

In one embodiment, the data driving chip further includes a first digital-to-analog converter, a second digital-to-analog converter, a first amplifier, a second amplifier, a first load resistor, a second load resistor, a first capacitor and a second capacitor; an input of the first digital-to-analog converter is connected with the gamma chip, an output of the first digital-to-analog converter is connected with an in-phase input of the first amplifier, an inverting input of the first digital-to-analog converter is connected with an output of the first digital-to-analog converter, the first load resistor and the first capacitor are serially connected between an output of the first digital-to-analog converter and the ground, a power terminal of the first digital-to-analog converter is connected with the power supply chip, a ground terminal of the first digital-to-analog converter is connected with the third voltage generation circuit, an input of the second digital-to-analog converter is connected with the gamma chip, and an output of the second digital-to-analog converter is connected with an in-phase input of the second amplifier, an inverting input of the second digital-to-analog converter is connected with an output of the second digital-to-analog converter, the second load resistor and the second capacitor are serially connected between the output of the second digital-to-analog converter and the ground, a power terminal of the second digital-to-analog converter is connected with the third voltage generation circuit, and a ground terminal of the second digital-to-analog converter is grounded.

Additionally, a display panel power supply system is further provided, the display panel power supply system includes an external power supply, a data driving chip and a display panel power supply circuit connected between the external power source and the data driving chip, where the display panel power supply circuit includes:

a power supply chip configured to be connected with the external power supply and convert the external power supply into a first voltage and a second voltage;

a gamma chip configured to be connected with the power supply chip and the data driving chip and receive the first voltage and the second voltage and generate a gamma voltage according to the first voltage and the second voltage; and a third voltage generation circuit configured to be connected with the gamma chip and generate a third voltage according to the gamma voltage, where the third voltage generation circuit is arranged in the data driving chip;

where the first voltage, the second voltage and the third voltage each are working voltages of the data driving chip.

In one embodiment, the third voltage generation circuit includes a first resistor, a second resistor, a first switching transistor and a second switching transistor; a first end of the first resistor serves as a first input of the third voltage generation circuit, a first end of the second resistor serves as a second input of the third voltage generation circuit, a second end of the first resistor is connected with a second end of the second resistor, an input of the first switching transistor is connected with the power supply chip, an input of the second switching transistor is grounded, an output of the first switching transistor is connected with an output of the second switching transistor, a control terminal of the first switching transistor is connected with a control terminal of the second switching transistor, a common connection terminal of the first resistor and the second resistor are connected with a common connection terminal of a control terminal of the first switching transistor and a control terminal of the second switching transistor, and a common connection terminal of an output of the first switching transistor and an output of the second switching transistor serves as an output of the third voltage generation circuit.

In one embodiment, the first switching transistor is a NPN triode and the second switching transistor is a PNP triode.

In one embodiment, the first switching transistor is a MOS transistor and the second switching transistor is a MOS transistor.

In one embodiment, the gamma voltage includes n paths output voltages, where N is a positive integer that is no less than 2, and any two paths output voltages in the N output voltages are connected with the third voltage generation circuit.

In one embodiment, N is equal to 18, where both the ninth voltage and the tenth voltage are connected with the third voltage generation circuit.

In one embodiment, the power supply chip is a switch power supply voltage stabilization integrated circuit.

In one embodiment, the data driving chip further includes a first digital-to-analog converter, a second digital-to-analog converter, a first amplifier, a second amplifier, a first load resistor, a second load resistor, a first capacitor and a second capacitor; an input of the first digital-to-analog converter is connected with the gamma chip, an output of the first digital-to-analog converter is connected with an in-phase input of the first amplifier, an inverting input of the first digital-to-analog converter is connected with an output of the first digital-to-analog converter, the first load resistor and the first capacitor are serially connected between an output of the first digital-to-analog converter and the ground, a power terminal of the first digital-to-analog converter is connected with the power supply chip, a ground terminal of the first digital-to-analog converter is connected with the third voltage generation circuit, an input of the second digital-to-analog converter is connected with the gamma chip, and an output of the second digital-to-analog converter is connected with an in-phase input of the second amplifier, an inverting input of the second digital-to-analog converter is connected with an output of the second digital-to-analog converter, the second load resistor and the second capacitor are serially connected between the output of the second digital-to-analog converter and the ground, a power terminal of the second digital-to-analog converter is connected with the third voltage generation circuit, and a ground terminal of the second digital-to-analog converter is grounded.

Additionally, a display device is further provided, the display device includes the display panel power supply system.

In one embodiment, the third voltage generation circuit includes a first resistor, a second resistor, a first switching transistor and a second switching transistor; a first end of the first resistor serves as a first input of the third voltage generation circuit, a first end of the second resistor serves as a second input of the third voltage generation circuit, a second end of the first resistor is connected with a second end of the second resistor, an input of the first switching transistor is connected with the power supply chip, an input of the second switching transistor is grounded, an output of the first switching transistor is connected with an output of the second switching transistor, a control terminal of the first switching transistor is connected with a control terminal of the second switching transistor, a common connection terminal of the first resistor and the second resistor are connected with a common connection terminal of a control terminal of the first switching transistor and a control terminal of the second switching transistor, and a common connection terminal of an output of the first switching transistor and an output of the second switching transistor serves as an output of the third voltage generation circuit.

In one embodiment, the first switching transistor is a NPN triode and the second switching transistor is a PNP triode.

In one embodiment, the data driving chip further includes a first digital-to-analog converter, a second digital-to-analog converter and a first amplifier, a second amplifier, a first load resistor, a second load resistor, a first capacitor and a second capacitor; an input of the first digital-to-analog converter is connected with the gamma chip, an output of the first digital-to-analog converter is connected with the in-phase input of the first amplifier, an inverting input of the first digital-to-analog converter is connected with an output of the first digital-to-analog converter, the first load resistor and the first capacitor are serially connected between an output of the first digital-to-analog converter and the ground, a power terminal of the first digital-to-analog converter is connected with the power supply chip, a ground terminal of the first digital-to-analog converter is connected with the third voltage generation circuit, an input of the second digital-to-analog converter is connected with the gamma chip, and an output of the second d digital-to-analog converter is connected with an in-phase input of the second amplifier, an inverting input of the second digital-to-analog converter is connected with an output of the second digital-to-analog converter, the second load resistor and the second capacitor are serially connected between the output of the second digital-to-analog converter and the ground, a power terminal of the second digital-to-analog converter is connected with the third voltage generation circuit, and a ground terminal of the second digital-to-analog converter is grounded.

In the display panel power supply circuit of the embodiment of the present disclosure, an internal design of the data driving chip is modified, the voltage as output by the gamma chip is utilized, the third voltage generation circuit is used to generate the third voltage HVAA inside the third voltage generation circuit and the third voltage HVAA is connected to a power terminal HVAA of the data driving chip, and a third voltage generation circuit in the power supply chip is removed, and an object of reducing the cost and the area of the circuit board, and improving the competitiveness of the product is implemented.

EMBODIMENTS OF THE PRESENT DISCLOSURE

Figure 1:
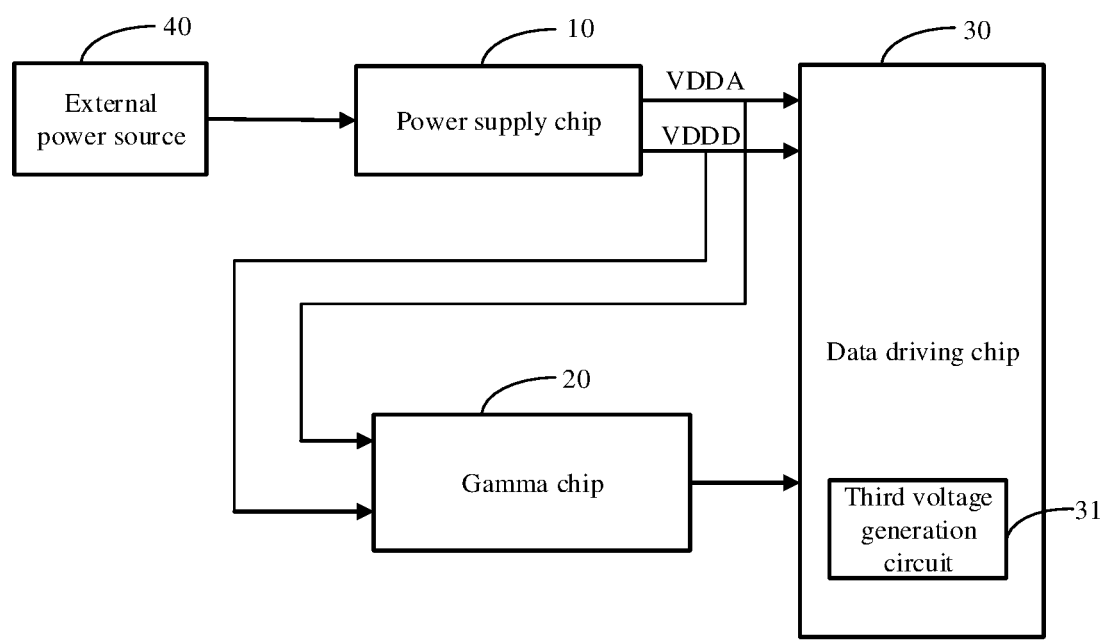
FIG. 1 illustrates a structure schematic diagram of a power panel power supply circuit provided by an embodiment of the present disclosure.

In order to make the ordinarily skilled one in the art to understand the technical solutions of the present disclosure better, technical solutions in the embodiments of the present disclosure will be described in detail below with reference to the accompanying drawings in the embodiments of the present disclosure. It is obvious that, the embodiments described below are merely part of the embodiments of the present disclosure, but not the whole of the embodiments. Based on the embodiments in the present disclosure, some other embodiments, which are obtained by the ordinarily skilled one in the art at the premise of paying no creative labor, should all be included in the protection scope of the present disclosure.

Terms of "comprising/including" and any modification thereof in the description, the claims and the aforesaid drawings are intended to cover non-exclusive inclusion, such as including a process of a series of steps or units, a method or a system, a product or a device, which is not limited to the listed steps or units, but optionally further includes the steps or units that are not listed, or optionally further includes other steps or elements inherent to these processes, method, product or device. In addition, terms of "first", "second", and "third" are configured to distinguish different objects instead of configured to describe a specific sequence.

In order to describe the aforesaid technical solutions in the present disclosure, a detailed description will be given with reference to the specific drawings and the embodiments An embodiment of the present disclosure provides a display panel power supply system, this display panel power supply system includes an external power supply 40, a data driving chip 30 and a display panel power supply circuit connected between the external power supply 40 and the data driving chip 30, a display driving circuit is configured to convert the external power supply 40 into a working voltage as needed by the data driving chip 30, thereby maintaining a normal operation of the data driving chip 30.

In an application, the data driving chip 30 may be any equipment or circuit that is capable of performing a data driving function on pixels of the display panel such as a source driver IC (Integrated Circuit), or a S-COF (Source-Chip on Film) or the like.

In an application, the display panel may be any type of display panel, such as a liquid crystal display panel based on TFT-LCD (Thin Film Transistor Liquid Crystal Display) technology, a liquid crystal display panel based on LCD (Liquid Crystal Display) technology, an OLED (Organic Light-emitting Display) display panel based OLED technology, a QLED (Quantum Dot Light Emitting Diode) display panel based on QLED technology or a curved display panel and the like.

Where the display panel power supply circuit is connected between the external power supply 40 and the data driving chip 30, the display panel power supply circuit includes a power supply chip 10, a gamma chip 20 and a third voltage generation circuit 31 arranged in the data driving chip 30.

The power supply chip 10 is connected to the external power supply 40 and is configured to convert the external power supply 40 into a first voltage VDDA and a second voltage VDDD, the first voltage VDDA and the second voltage VDDD are output to the gamma chip 20 and the data driving chip 30; on one hand, the working voltage as needed by the data driving chip 30 is provided, on the other hand, an input voltage of the gamma chip 20 is provided.

The gamma chip 20 is connected with the power chip 10 and the data driving chip 30, receives the first voltage VDDA and the second voltage VDDD and generates a gamma voltage according to the first voltage VDDA and the second voltage VDDD. The gamma voltage includes N paths output voltages, where N>2, any two paths voltages in the N paths output voltages are connected with a third voltage generation circuit. In an embodiment, the gamma chip 20 receives the first voltage VDDA and the second voltage VDDD and generates a total of 18 paths voltages of GAM1-GAM18, and then is connected to the data driving chip 30 through a wiring of a circuit board to output the 18 paths voltages to the data driving chip 30.

The display panel power supply circuit further includes a third voltage generation circuit 31 arranged in the data driving chip 30, the third voltage generation circuit 31 is connected with the gamma chip 20 and generates a third voltage HVAA according to the gamma voltage. Where, the first voltage VDDA, the second voltage VDDD and the third voltage HVAA each are working voltages of the data driving chip 30.

Figure 2:
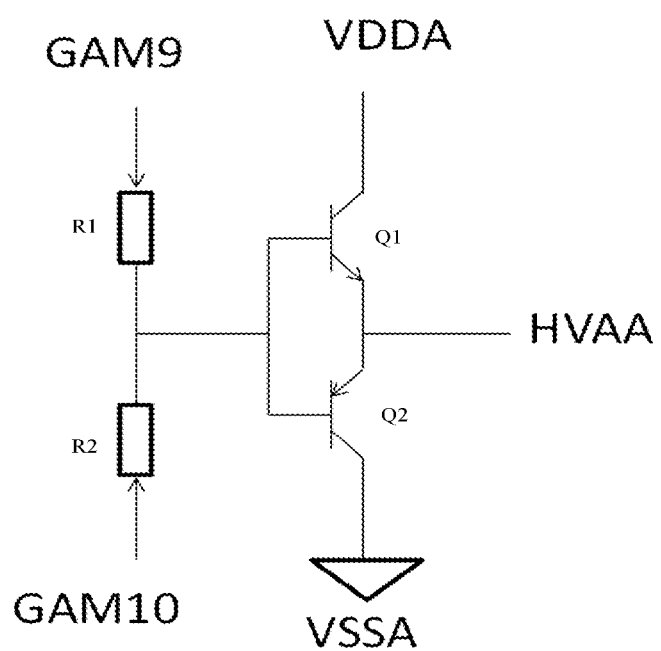
FIG. 2 illustrates an exemplified schematic circuit diagram of a third voltage generation circuit in the display panel power supply circuit shown in FIG. 1.

As shown in FIG. 2, in an embodiment, the data driving chip 30 is connected to the third voltage generation circuit according to the two connected paths voltages of a ninth path voltage GAM9 and a tenth voltage GAM10 to generate the third voltage HVAA. Where the third voltage generation circuit 31 includes a first resistor R1 and a second resistor R2; a first switching transistor Q1 and a second switching transistor Q2, a first end of the first resistor R1 serves as a first input of the third voltage generation circuit 31, a first end of the second resistor R2 serves as a second input of the third voltage generation circuit 31, a second end of the first resistor R1 is connected with a second end of the second resistor R2, an input of the first switching transistor Q1 is connected with the power supply chip 10, an input of the second switching transistor Q2 is grounded, an output of the first switching transistor Q1 is connected with an output of the second switching transistor Q2, a control terminal of the first switching transistor Q1 is connected with a control terminal of the second switching transistor Q2, a common connection terminal of the first resistor R1 and the second resistor R2 are connected with a common connection terminal of a control terminal of the first switching transistor Q1 and a control terminal of the second switching transistor Q2, and a common connection terminal of an output of the first switching transistor Q1 and an output of the second switching transistor Q2 serves as an output of the third voltage generation circuit 31.

Further, the first switching transistor Q1 is a NPN triode, and the second switching transistor Q2 is a PNP type triode. An emitting electrode of the first switching transistor Q1 is connected with the power chip 10, an emitting electrode of the second switching transistor Q2 is grounded, a collector electrode of the first switching transistor Q1 is connected with a collector electrode of the second switching transistor Q2, a base electrode of the first switching transistor Q1 is connected with a base electrode of the second switching transistor Q2, a common connection terminal of the base electrode of the first switching transistor Q1 and the base electrode of the second switching transistor Q2 is connected with the common connection terminal of the first resistor R1 and the second resistor R2, and a common connection terminal of the collector electrode of the first switching transistor Q1 and the collector electrode of the second switching transistor Q2 serves as an output of the third voltage generation circuit 31. In other embodiments, the first switching transistor Q1 and the second switching transistor Q2 may be replaced by an MOS (Metal Oxide Semiconductor) transistor or other electronic switch equipment which may implement the same function as the first switching transistor Q1 and the second switching transistor Q2.

Figure 3:
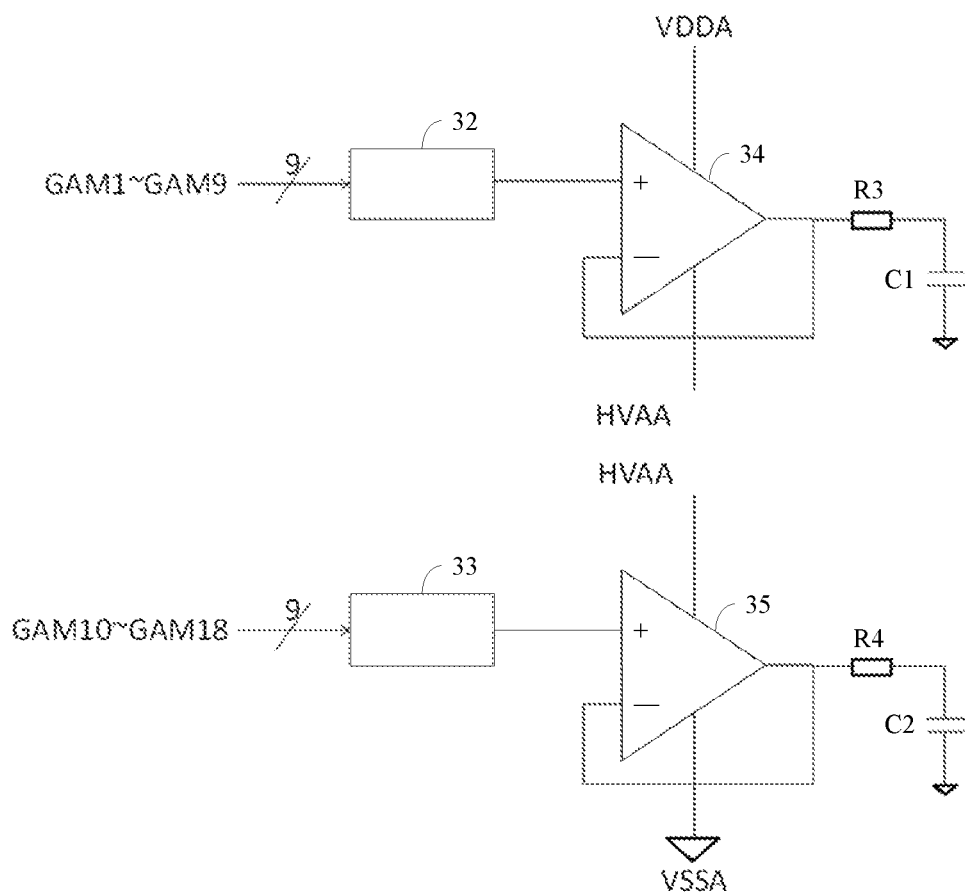
FIG. 3 illustrates a partial schematic circuit diagram of a data driving chip provided by an embodiment of the present disclosure.

As shown in FIG. 3, in an application, the third voltage HVVA is connected with an amplifier circuit in the data driving chip and is configured to provide a working power supply needed by the amplifier circuit in the data driving chip. Particularly, the data driving chip 30 further includes a first digital-to-analog converter 32, a second digital-to-analog converter 33, a first amplifier 34, a second amplifier 35, a first load resistor R3, a second load resistor R4, a first capacitor C1 and a second capacitor C2; an input of the first digital-to-analog converter 32 is connected with the gamma chip 20, an output of the first digital-to-analog converter 32 is connected with an in-phase input of the first amplifier 34, an inverting input of the first digital-to-analog converter 32 is connected with an output of the first digital-to-analog converter 32, the first load resistor R3 and the first capacitor C1 are serially connected between an output of the first digital-to-analog converter 32 and the ground, a power terminal of the first digital-to-analog converter is connected with the power supply chip 10, a ground terminal of the first digital-to-analog converter 32 is connected with the third voltage generation circuit 31, an input of the second digital-to-analog converter 33 is connected with the gamma chip 20, and an output of the second digital-to-analog converter 33 is connected with an in-phase input of the second amplifier 35, an inverting input of the second digital-to-analog converter 33 is connected with an output of the second digital-to-analog converter 33, the second load resistor R4 and the second capacitor C2 are serially connected between the output of the second digital-to-analog converter 33 and the ground, a power terminal of the second digital-to-analog converter 33 is connected with the third voltage generation circuit 31, and a ground terminal of the second digital-to-analog converter 33 is grounded. The input of the first digital-to-analog converter 32 receives nine paths voltages of GAM1-GAM9, the input end of the second digital-to-analog converter 33 receives nine paths voltage of GAM10-GAM18, the third voltage HVAA needed in the aforesaid circuit is provided by the third voltage generation circuit 31 arranged in the data driving chip 30, there is no need to arrange the third voltage unit in the power supply chip 10; not only a design cost and a design complexity of the power chip 10 are reduced, but also a wiring of the circuit board is reduced, and thus a production cost is reduced.

Based on the display panel power supply system, the present disclosure further provides a display device which includes the aforesaid display panel power supply system.

Additionally, the present disclosure further provides a display device based on the display panel power supply system, and the display device includes the aforesaid display panel power supply system.

In conclusion, the embodiment of the present disclosure provides a display panel power supply system and a display panel power supply circuit thereof, the display panel power supply system includes the external power supply 40, the data driving chip 30 and the display panel power supply circuit connected between the external power supply 40 and the data driving chip 30, where the display panel power supply circuit includes the power supply chip 10, the gamma chip 20 and the third voltage generation circuit 31 arranged in the data driving chip 30. An internal design of the data driving chip 30 is modified, the voltage as output by the gamma chip 20 is utilized, the third voltage generation circuit 31 is used to generate the third voltage HVAA inside the third voltage generation circuit 31 and the third voltage HVAA is connected to a power terminal HVAA of the data driving chip 30, and a third voltage HVAA generation circuit in the power supply chip 10 is removed, such that the cost is reduced, the area of the circuit board is reduced, and the competitiveness of the product is improved.

The aforementioned embodiments are only preferable embodiments of the present disclosure, and should not be regarded as being limitation to the present disclosure. Any modification, equivalent replacement, improvement and the like, which are made within the spirit and the principle of the present disclosure, should all be included in the protection scope of the present disclosure.

What is claimed is:
1. A display panel power supply circuit configured to be connected with an external power supply and a data driving chip, comprising:
 a power supply chip configured to be connected with the external power supply and convert the external power supply into a first voltage and a second voltage;
 a gamma chip configured to be connected with the power supply chip and the data driving chip and receive the first voltage and the second voltage and generate a gamma voltage according to the first voltage and the second voltage;
 a third voltage generation circuit configured to be connected with the gamma chip and generate a third voltage according to the gamma voltage, wherein the third voltage generation circuit is arranged in the data driving chip;

wherein the first voltage, the second voltage and the third voltage each are working voltages of the data driving chip;

the third voltage generation circuit comprises a first resistor, a second resistor, a first switching transistor and a second switching transistor; a first end of the first resistor serves as a first input of the third voltage generation circuit, a first end of the second resistor serves as a second input of the third voltage generation circuit, a second end of the first resistor is connected with a second end of the second resistor, an input of the first switching transistor is connected with the power supply chip, an input of the second switching transistor is grounded, an output of the first switching transistor is connected with an output of the second switching transistor, a control terminal of the first switching transistor is connected with a control terminal of the second switching transistor, a common connection terminal of the first resistor and the second resistor are connected with a common connection terminal of the control terminal of the first switching transistor and the control terminal of the second switching transistor, and a common connection terminal of the output of the first switching transistor and the output of the second switching transistor serves as an output of the third voltage generation circuit.

2. The display panel power supply circuit according to claim 1, wherein the first switching transistor is a NPN triode and the second switching transistor is a PNP triode.

3. The display panel power supply circuit according to claim 1, wherein the first switching transistor is a MOS transistor and the second switching transistor is a MOS transistor.

4. The display panel power supply circuit according to claim 1, wherein the gamma voltage comprises n paths output voltages, wherein N is a positive integer that is no less than 2, and any two paths output voltages in the N output voltages are connected with the third voltage generation circuit.

5. The display panel power supply circuit according to claim 4, wherein N is equal to 18, wherein both a ninth voltage and a tenth voltage are connected with the third voltage generation circuit.

6. The display panel power supply circuit according to claim 1, wherein the power supply chip is a switch power supply voltage stabilization integrated circuit.

7. A display panel power supply system, comprising an external power supply, a data driving chip and a display panel power supply circuit connected between the external power source and the data driving chip, wherein the display panel power supply circuit comprises:

a power supply chip configured to be connected with the external power supply and configured to convert the external power supply into a first voltage and a second voltage;

a gamma chip configured to be connected with the power supply chip and the data driving chip and receive the first voltage and the second voltage and generate a gamma voltage according to the first voltage and the second voltage; and a third voltage generation circuit configured to be connected with the gamma chip and generate a third voltage according to the gamma voltage, wherein the third voltage generation circuit is arranged in the data driving chip;

wherein the first voltage, the second voltage and the third voltage each are working voltages of the data driving chip;

the third voltage generation circuit comprises a first resistor, a second resistor, a first switching transistor and a second switching transistor; a first end of the first resistor serves as a first input of the third voltage generation circuit, a first end of the second resistor serves as a second input of the third voltage generation circuit, a second end of the first resistor is connected with a second end of the second resistor, an input of the first switching transistor is connected with the power supply chip, an input of the second switching transistor is grounded, an output of the first switching transistor is connected with an output of the second switching transistor, a control terminal of the first switching transistor is connected with a control terminal of the second switching transistor, a common connection terminal of the first resistor and the second resistor are connected with a common connection terminal of the control terminal of the first switching transistor and the control terminal of the second switching transistor, and a common connection terminal of the output of the first switching transistor and the output of the second switching transistor serves as an output of the third voltage generation circuit.

8. The display panel power supply system according to claim 7, wherein the first switching transistor is a NPN triode and the second switching transistor is a PNP triode.

9. The display panel power supply system according to claim 7, wherein the first switching transistor is a MOS transistor and the second switching transistor is also a MOS transistor.

10. The display panel power supply system according to claim 7, wherein the gamma voltage comprises n paths output voltages, wherein N is a positive integer no less than 2, and any two paths output voltages in the N output voltages are connected with the third voltage generation circuit.

11. The display panel power supply system according to claim 10, wherein N is equal to 18, wherein both the ninth voltage and the tenth voltage are connected with the third voltage generation circuit.

12. The display panel power supply system according to claim 7, wherein the power supply chip is a switch power supply voltage stabilization integrated circuit.

13. A display device, comprising:

an external power supply, a data driving chip and a display panel power supply circuit connected between the external power supply and the data driving chip;

wherein the display panel power supply circuit comprises:

a power supply chip configured to be connected with the external power supply and convert the external power supply into a first voltage and a second voltage;

a gamma chip configured to be connected with the power supply chip and the data driving chip and receive the first voltage and the second voltage and generate a gamma voltage according to the first voltage and the second voltage; and a third voltage generation circuit configured to be connected with the gamma chip and generate a third voltage according to the gamma voltage, wherein the third voltage generation circuit is arranged in the data driving chip;

wherein the first voltage, the second voltage and the third voltage each are working voltages of the data driving chip;

the third voltage generation circuit comprises a first resistor, a second resistor, a first switching transistor and a second switching transistor; a first end of the first resistor serves as a first input of the third voltage generation circuit, a first end of the second resistor serves as a second input of the third voltage generation circuit, a second end of the first resistor is connected with a second end of the second resistor, an input of the first switching transistor is connected with the power supply chip, an input of the second switching transistor is grounded, an output of the first switching transistor is connected with an output of the second switching transistor, a control terminal of the first switching transistor is connected with a control terminal of the second switching transistor, a common connection terminal of the first resistor and the second resistor are connected with a common connection terminal of the control terminal of the first switching transistor and the control terminal of the second switching transistor, and a common connection terminal of the output of the first switching transistor and the output of the second switching transistor serves as an output of the third voltage generation circuit.

14. The display device according to claim 13, wherein the first switching transistor is a NPN triode and the second switching transistor is a PNP triode.

* * * * *